United States Patent [19]

Jones et al.

[11] Patent Number: 5,242,557
[45] Date of Patent: Sep. 7, 1993

[54] METHOD FOR PREPARING PIGMENTS

[75] Inventors: William J. Jones, Tasmania, Australia; Judith F. Tooze, Stockton on Tees, England

[73] Assignee: Tioxide Group Services Limited, London, England

[21] Appl. No.: 822,009

[22] Filed: Jan. 17, 1992

[30] Foreign Application Priority Data

Mar. 21, 1991 [GB] United Kingdom ............ 9105980

[51] Int. Cl.$^5$ ........................................... C01B 13/14
[52] U.S. Cl. ........................ 204/157.42; 204/157.51
[58] Field of Search .......... 204/157.42, 157.5, 157.51; 423/610

[56] References Cited

U.S. PATENT DOCUMENTS

| | | | |
|---|---|---|---|
| 3,329,484 | 7/1967 | Long et al. | 23/202 |
| 3,528,773 | 9/1970 | Surls et al. | 23/202 |
| 3,635,671 | 1/1972 | Iveter et al. | 23/202 R |
| 3,923,968 | 12/1975 | Basque et al. | 423/611 |
| 5,024,827 | 6/1991 | Jones et al. | 423/610 |

FOREIGN PATENT DOCUMENTS

| | | |
|---|---|---|
| 2913238 | 4/1983 | Fed. Rep. of Germany . |
| 51-014897 | 2/1976 | Japan . |
| 60-226413 | 11/1985 | Japan . |
| 1149992 | 4/1985 | U.S.S.R. . |
| 1055108 | 1/1967 | United Kingdom . |
| 1109838 | 4/1968 | United Kingdom . |
| 2221901 | 2/1990 | United Kingdom . |

Primary Examiner—John Niebling
Assistant Examiner—C. Delacroix-Muirheid
Attorney, Agent, or Firm—Baker & Botts

[57] ABSTRACT

A method for preparing pigmentary titanium dioxide is claimed. An aqueous solution of a titanium halide is mixed with 0.1 to 1.0% by weight titanium dioxide nuclei and the resultant mixture is heated in a sealed vessel to 150° to 300° C. at which temperature it is maintained for at least 15 minutes. The mixture is subjected to ultrasonic vibrations for at least a part of the heating process.

The product of the process is useful as a white pigment without need for further treatment to optimise its particle size.

18 Claims, No Drawings

METHOD FOR PREPARING PIGMENTS

This invention relates to a method for preparing pigments and in particular to a method for preparing titanium dioxide pigments by hydrothermal precipitation.

Pigment grade titanium dioxide is commercially prepared generally by the so-called sulphate process or the so-called chloride process.

In the sulphate process a titanium-bearing ore such as ilmenite is reacted with sulphuric acid and the cake formed is dissolved in water or weak acid. The resultant solution after reduction and clarification is hydrolysed to precipitate hydrous titanium dioxide. After separation and washing the hydrous titanium dioxide is calcined to develop the crystal form and particle size distribution which is desirable for pigmentary titanium dioxide.

In the chloride process a titanium-bearing ore (e.g. rutile) is reacted with chlorine to form titanium tetrachloride which is then purified. The purified titanium tetrachloride is then reacted with oxygen at high temperatures to form pigmentary titanium dioxide.

The calcination step of the sulphate process and the oxidation step of the chloride process are both difficult to control to produce optimum pigmentary titanium dioxide and both require the input of large amounts of energy.

Alternative processes for the production of pigmentary titanium dioxide include autothermal processes in which an aqueous solution of a titanium compound is hydrolysed under the pressure generated by heating the solution above its boiling point in a sealed vessel. Generally, however, the particle size and particle size distribution of titanium dioxide produced by these methods are such that its pigmentary properties are poor.

The method of the present invention provides a titanium dioxide with good pigmentary properties.

According to the invention a method for preparing pigmentary titanium dioxide comprises mixing an aqueous solution of a titanium halide with an amount of particulate titanium dioxide nuclei comprising 0.1 to 1.0% by weight based on weight of titanium halide expressed as $TiO_2$, heating the mixture so obtained over a period in a sealed vessel to a temperature of from 150° C. to 300° C. and maintaining the mixture at a temperature between 150° C. and 300° C. for a further period of at least 15 minutes wherein the said mixture is subjected to the effect of ultrasonic vibrations during at least a part of at least one of said periods.

The titanium halide which is converted to titanium dioxide by the method of the invention can be any titanium halide which can be dissolved in water but which hydrolyses when heated under the conditions of the method. The most useful titanium halides are titanium chlorides.

The titanium halide is used in the method of the invention in the form of an aqueous solution. When a titanium chloride is employed the solution is, for example, prepared by diluting substantially pure titanium tetrachloride with water or by digesting ilmenite in hydrochloric acid.

The concentration of the aqueous solution is such that it, preferably, contains an amount of titanium halide equivalent to from about 50 g/l to about 300 g/l titanium dioxide.

The particles of titanium dioxide which are used as nuclei have a particle size which promotes the formation of pigmentary titanium dioxide which is the product of the method of the invention.

The nuclei can be formed by any suitable process but, typically, a portion of the aqueous solution of titanium halide is diluted with 5 to 10 times its own volume of water and the resultant solution is boiled for about 15 minutes.

Nuclei can be so-called rutile nuclei or anatase nuclei i.e. they tend to promote formation of rutile titanium dioxide or anatase titanium dioxide during the formation of the titanium dioxide. The size of nuclei can be extremely difficult to measure but there have been indications that one form of rutile promoting nuclei, when dry, is acicular in shape having a size of the order of 12 nm to 17.5 nm by 5 nm to 9 nm. One form of anatase promoting nuclei is approximately spherical and has a particle diameter of from say 2.5 nm to 7 nm.

The amount of nuclei used, to some extent, determines the final crystal size of the pigmentary titanium dioxide formed and a nuclei concentration of 0.1 to 1.0% by weight based on weight of titanium halide expressed as $TiO_2$ is used. Preferably 0.3 to 0.6% by weight with respect to titanium halide expressed as $TiO_2$ is used.

The pigmentary titanium dioxide is formed by heating the aqueous solution and particulate titanium dioxide nuclei in a sealed vessel to a temperature between 150° C. and 300° C. and subsequently maintaining the mixture at a temperature within this range for at least 15 minutes. The mixture is preferably maintained at this elevated temperature for between 15 and 90 minutes and, more preferably, for between 15 and 30 minutes.

Most preferably, the mixture is heated to a temperature between 200° C. and 250° C. and held at a temperature in that range for at least 15 minutes.

During at least a part of at least one heating period the mixture is subjected to the effect of ultrasonic vibrations. Preferably the ultrasonic vibrations are maintained throughout both the heating periods.

The ultrasonic vibrations used in the method of the invention are those known as power ultrasound usually employing frequencies of 10 kHz to 50 kHz but the preferable frequency is about 20 kHz. Preferably the ultrasonic power output into the mixture is within the range 100 to 500 watts per liter of mixture and most desirably within the range 250 to 350 watts per liter.

Any equipment which can withstand the autothermal pressures developed in the method can be used but a convenient apparatus for laboratory scale experiments consists of a substantially cylindrical autoclave equipped with an axially aligned ultrasonic horn which is arranged so as to be immersed in the mixture during the heating periods.

The product of the method of the invention is useful as a white pigment in, for example, paints, inks, paper and plastics without need for further treatment to optimise its particle size and particle size distribution. The pigmentary properties and, in particular, tinting strength are considerably better than for titanium dioxide prepared in a similar manner but without the use of ultrasonic vibrations.

The pigmentary titanium dioxide can be coated with inorganic or organic compounds by conventional techniques to further improve properties such as durability and dispersibility.

The invention is particularly described by the following examples.

EXAMPLE 1

An aqueous solution of titanium chloride was formed by diluting titanium tetrachloride with sufficient water so as to contain the equivalent of 140 g/l $TiO_2$. 550 mls of the solution were placed in an autoclave having a nominal capacity of 1 liter made from Hastelloy C-276 and having a tantalum liner. A slurry of titanium dioxide nuclei was prepared by diluting 2.5 mls of the aqueous titanium chloride solution with water in a ratio of 7.5 parts water to 1 part solution by volume and the diluted solution was boiled for 15 minutes. This slurry was added to the autoclave giving a concentration of nuclei of 0.5% with respect to Ti in solution. An ultrasonic horn was positioned so as to be immersed within the aqueous solution and the autoclave was sealed. Electric power was supplied to the ultrasonic horn whilst the mixture of aqueous solution and nuclei was heated to 200° C. The sound produced had a frequency of 20 kHz at a power of 200 watts. After holding the mixture for 30 minutes at 200° C. the ultrasonic horn was switched off and the autoclave was allowed to cool to room temperature.

Titanium dioxide which had been formed was separated by filtration, washed with water and acetone and dried at room temperature. After grinding by hand, the tinting strength was found to be 1590.

EXAMPLE 1A (COMPARATIVE)

Example 1 was repeated except that no electric power was supplied to the ultrasonic horn. After grinding the tinting strength of the titanium dioxide formed was found to be 1120.

EXAMPLE 2

Example 1 was repeated except that the aqueous solution was heated to 250° C. and held at this temperature for 30 minutes in the presence of 0.5% by weight of nuclei expressed as $TiO_2$. After grinding the tinting strength of the titanium dioxide produced was found to be 1600.

A sample of the titanium dioxide produced was compared with a standard uncoated rutile titanium dioxide prepared by the chloride process in an air-drying resin sold under the name of Sobral P470 at 17% pigment volume concentration with the following results.

|  | Contrast Ratio of 25 microns film | Scattering Coefficient (microns$^{-1}$) |
|---|---|---|
| Example 2 | 92.0% | 2.685 |
| Standard | 93.1% | 2.618 |

We claim:

1. A method for preparing pigmentary titanium dioxide comprising mixing an aqueous solution of a titanium halide with an amount of particulate titanium dioxide nuclei comprising 0.1 to 1.0% by weight based on weight of titanium halide expressed as $TiO_2$, heating the mixture so obtained over a period in a sealed vessel to a temperature of from 150° C. to 300° C. and maintaining the mixture at a temperature between 150° C. and 300° C. for a further period of at least 15 minutes wherein the said mixture is subjected to the effect of ultrasonic vibrations during at least a part of at least one of said periods.

2. A method according to claim 1 in which the titanium halide is a titanium chloride.

3. A method according to claim 2 in which the aqueous solution of titanium chloride is prepared by diluting substantially pure titanium tetrachloride with water.

4. A method according to claim 2 in which the aqueous solution of titanium chloride is prepared by dissolving ilmenite in hydrochloric acid.

5. A method according to claim 1 in which the aqueous solution of titanium halide has a concentration equivalent to from about 50 g/l to about 300 g/l titanium dioxide.

6. A method according to claim 1 in which the particulate titanium dioxide nuclei are prepared by diluting a portion of the aqueous solution of titanium halide with water in a ratio of 5 to 10 volume parts of water to 1 volume part of aqueous solution and boiling the diluted solution produced for about 15 minutes.

7. A method according to claim 1 in which the nuclei are acicular in shape and have a longest dimension of from 12 nm to 17.5 nm and a shortest dimension of from 5 nm to 9 nm.

8. A method according to claim 1 in which the nuclei are approximately spherical and have a particle diameter of from 2.5 nm to 7 nm.

9. A method according to claim 1 in which the amount of particulate titanium dioxide nuclei used is from 0.3 to 0.6% by weight with respect to titanium halide expressed as $TiO_2$.

10. A method according to claim 1 in which the mixture is heated at a temperature between 150° C. and 300° C. for a period of between 15 and 90 minutes.

11. A method according to claim 10 in which the period is between 15 and 30 minutes.

12. A method according to claim 1 in which the mixture is heated to a temperature between 200° C. and 250° C. and is held at a temperature between 200° C. and 250° C. for at least 15 minutes.

13. A method according to claim 1 in which the mixture is subjected to ultrasonic vibrations during the whole of both heating periods.

14. A method according to claim 1 in which the ultrasonic vibrations employed have a frequency of from 10 kHz to 50 kHz.

15. A method according to claim 14 in which the frequency is about 20 kHz.

16. A method according to claim 1 in which the ultrasonic vibrations employed have a power output into the mixture of from 100 to 500 watts per liter of mixture.

17. A method according to claim 16 in which the power output is from 250 to 350 watts per liter of mixture.

18. The method of claim 1 wherein the sealed vessel comprises a substantially cylindrical autoclave with an axially aligned ultrasonic horn that produces ultrasonic vibrations and is immersible in the mixture.

* * * * *